(12) United States Patent
Yang et al.

(10) Patent No.: US 12,466,108 B2
(45) Date of Patent: Nov. 11, 2025

(54) METHODS OF FORMING BEVELS IN FLOORING PLANKS

(71) Applicant: Shaw Industries Group, Inc., Dalton, GA (US)

(72) Inventors: Jerry Yang, Shanghai (CN); Felix J. Herrera, Hanoi (VN); Bryant Nie, JiaXing (CN)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/881,173

(22) PCT Filed: Jun. 28, 2024

(86) PCT No.: PCT/US2024/036082
§ 371 (c)(1),
(2) Date: Jan. 3, 2025

(87) PCT Pub. No.: WO2025/006931
PCT Pub. Date: Jan. 2, 2025

(65) Prior Publication Data
US 2025/0170753 A1    May 29, 2025

Related U.S. Application Data

(60) Provisional application No. 63/523,789, filed on Jun. 28, 2023.

(51) Int. Cl.
*B28B 7/26* (2006.01)
*B28B 3/04* (2006.01)

(52) U.S. Cl.
CPC . *B28B 7/26* (2013.01); *B28B 3/04* (2013.01)

(58) Field of Classification Search
CPC .................................. B28B 7/26; B28B 3/04
See application file for complete search history.

(56) References Cited

U.S. PATENT DOCUMENTS

| | | |
|---|---|---|
| 7,425,359 B2 | 9/2008 | Zafiroglu |
| 2004/0086678 A1* | 5/2004 | Chen ................. B44C 5/0461 |
| | | 428/44 |
| 2004/0106346 A1* | 6/2004 | Zafiroglu ................ E04F 15/02 |
| | | 442/149 |
| 2006/0157195 A1 | 7/2006 | Laurence et al. |

(Continued)

FOREIGN PATENT DOCUMENTS

WO    WO-2009141743 A1 * 11/2009 ............ B32B 37/025

OTHER PUBLICATIONS

Written Opinion of International Searching Authority, companion PCT Application No. PCT/US2024/036082, dated Oct. 10, 2024.

(Continued)

*Primary Examiner* — Jacob T Minskey
*Assistant Examiner* — Virak Nguon
(74) *Attorney, Agent, or Firm* — Miller & Martin PLLC

(57) ABSTRACT

The present disclosure provides a novel technique for creating bevels along the edges of flooring planks having a hard and rigid core layer, preferably comprising a magnesium-based cement or other type of curable binder material. The disclosed embodiments use the inherent time it takes for a cement binder in the core layer to harden and cure to concurrently shape bevels along one or more edges of the rigid core layer for one or more flooring planks.

22 Claims, 5 Drawing Sheets

(56) References Cited

U.S. PATENT DOCUMENTS

2012/0031543 A1      2/2012   Bacon et al.
2014/0069044 A1*   3/2014   Wallin .................. E04F 15/041
                                                                         52/588.1
2022/0389722 A1    12/2022   Van Essche et al.

OTHER PUBLICATIONS

International Search Report of International Searching Authority, companion PCT Application No. PCT/US2024/036082, dated Oct. 10, 2024.

* cited by examiner

METHODS OF FORMING BEVELS IN FLOORING PLANKS

CROSS-REFERENCE TO RELATED APPLICATIONS

The present application is a U.S. National Stage Application under 35 U.S.C. § 371 of PCT International Application No. PCT/US2024/036082, filed Jun. 28, 2024, which application claims the benefit of priority under 35 U.S.C. § 119(e) to U.S. Provisional Application No. 63/523,789, entitled "Method of Forming Bevels in Flooring Planks Having Rigid Cores," filed Jun. 28, 2023, which is hereby incorporated by reference in its entirety as if fully set forth herein.

TECHNICAL FIELD

The present disclosure relates to flooring planks and, more particularly, relates to novel systems and methods for forming bevels in a core layer for use in flooring planks.

BACKGROUND

Flooring planks are generally long, narrow, and flat pieces of material, and in some cases may comprise laminated structures having multiple layers that can be installed over a floor or subfloor. As used herein, a "flooring plank" may be any plank, tile, panel, or other type of floor-covering material. While flooring planks are often rectangular, they can be formed using other any other shapes (e.g., square, diamond, hexagonal, etc.) that interconnect to cover a contiguous area. In some cases, the flooring planks may comprise a core layer that provides certain desired properties to the flooring planks, such as strength, rigidity, and durability, and a decorative (décor) layer which makes the planks appear from above to consist of wood, stone, marble, or other natural material or desired aesthetic.

Because flooring planks are typically flat along each of their edges, floor installations may not easily distinguish individual planks and thus may have an unnatural appearance as compared to flooring installations composed entirely of a desired material, such as wood or stone. Forming sloped edges ("bevels") around the periphery of the flooring planks can improve their appearance over large flooring areas. As used herein, a "bevel" broadly includes any surface, straight and/or curved, that is not a sharp 90-degree angle at the edge of a flooring plank. In some cases, bevels may be created by cutting the edges at a desired angle, such as 45 degrees. Bevels also may be created by mechanically pressing the edges downwards and inwards, which may create sloped and rounded edges that look more natural.

Flooring planks having a core layer formed of magnesium oxide (MgO) are known for their rigidity, durability, and resistance to water and fire. However, there is a current need for an effective way to form beveled edges on such MgO flooring planks. Because MgO planks are brittle, having material properties similar to cement, flooring manufacturers cannot simply press bevels into the edges of these types of planks as they might with softer materials, such as wood or thermoplastic composites. Further, mechanically cutting bevels along the edges of MgO flooring planks is time consuming, labor intensive, and inefficient, and may require additional steps to smooth or shape the bevels along each individual plank.

Therefore, there exists a need for a process that enables the formation of bevels in MgO flooring planks in a less time consuming, less labor intensive, and more efficient manner.

SUMMARY

The present disclosure provides a novel technique for creating bevels along the edges of flooring planks having a rigid core layer, preferably comprising a magnesium-based cement or other type of cement. In some embodiments, for example, the core layer may comprise one or more of magnesium oxide, magnesium sulfate, magnesium chloride, and/or magnesium carbonate to form a cement binder material. In addition to the cement binder material, the core layer may comprise one or more additives, fillers, and/or fibers. In this context, a "cement binder" refers to a cement binder material alone or further combined with any one or more additives, fillers, and/or fibers to form a core layer of a flooring plank. In alternative embodiments, the cement binder may be replaced with any other material or combination of materials that cure and harden consistent with the disclosed exemplary embodiments herein. In some alternative embodiments, for example, the cement binder may be replaced with materials comprising one or more of medium density fiberboard (MDF), concrete, cement, plasterboard, or polyurethane (PU) materials. In some embodiments, the technique described in the disclosed embodiments may be used to form ceiling boards, wall boards, and/or flooring planks.

Unlike conventional techniques for forming bevels on flooring planks, the disclosed embodiments use the inherent time it takes for a cement binder in the core layer to harden and cure to concurrently shape bevels along one or more edges of the core layer for a flooring plank. In the case of an MgO core layer, for example, the time required for the curing process corresponds to the time for chemical reactions of MgO and one or more magnesium salts to form a magnesium-based cement, which in some cases can take several days. In accordance with the disclosed embodiments, a plate containing a pattern of bevels may be applied to a surface of the uncured cement binder as it is being cured. The pattern of bevels may correspond to the shapes and locations of beveled edges of one or more individual flooring planks. A pressure is preferably applied to the plate during the curing process to ensure the bevel pattern on the plate sufficiently penetrates, and is thus transferred to, the surface of the cement binder as it cures so the cement binder after curing includes the pattern of bevels on its surface. The pattern of bevels on the surface of the cement binder can then be used to divide the cement binder into a plurality core layers for individual flooring planks. The patterned plate may be formed of any materials, such as metals, ceramics, plastics, or various composites thereof, that maintain the shape of the cement binder and bevel pattern during the curing process.

A manufacturing process may be performed in which the components of an uncured cement binder are mixed together, and the mixture is transferred, such as in a dry powder form, into a plurality of trays for subsequent processing. The uncured cement binder is preferably compressed, such as using rollers in a calendaring process, to make the uncured cement binder in each tray have a consistent desired thickness. The plurality of trays containing uncured cement binder may be stacked one on top of the other, for example, up to 50 trays, as discussed below.

In first exemplary embodiments, a first tray containing the uncured cement binder may be positioned at the bottom of the stack. Next, a patterned plate may be stacked directly on top of the uncured cement binder in the first tray. In such embodiments, the patterned plate has a flat top surface and a bottom surface comprising a pattern of bevels extending out from the bottom surface. Thus, when the patterned plate is placed directly on top of the first tray, the pattern of bevels on the plate's bottom surface extends into the top surface of the uncured cement binder to transfer the bevel pattern into the cement binder as it cures. A second tray containing uncured cement binder may be stacked on the top of the patterned plate. Next, a second patterned plate, with a pattern of bevels on its bottom surface, may be placed directly on top of the second tray to transfer the bevel pattern to the uncured cement binder in the second tray. This stacking process using alternating trays and patterned plates may continue until a desired number of trays has been stacked.

In second exemplary embodiments, the plurality of trays described above may be replaced with a plurality of patterned plates. In such alternative embodiments, each tray having flat top and bottom surfaces in the first exemplary embodiments may be replaced with a patterned plate having a flat bottom surface and a top surface comprising a raised pattern of bevels. Therefore, when uncured cement binder is deposited into each such patterned plate, thus covering the raised bevel pattern, the pattern of bevels will define the shape and location of one or more bevels in a surface of the cement binder after it has cured. In these disclosed embodiments, each patterned plate may be stacked directly over an adjacent plate until a tray having flat top and bottom surfaces may be positioned as a capping layer above the topmost plate in the stack. In some implementations, these second embodiments may be advantageous because they require fewer trays and plates to create the stack as compared with the first embodiments above.

In accordance with the disclosed embodiments, a compressive force is preferably applied to the stack of trays and patterned plates while the cement binder is in the process of curing. In some embodiments, the stack of trays and plates may be positioned within a clamping mechanism or other vice-type of apparatus configured to apply compression forces to the outer surfaces of the trays or plates located at the top and/or bottom of the stack. The compression force may be constantly applied to the stack until the cement binder has cured, although it is also expressly contemplated that the compression force alternatively may be applied and removed or modified according to any desired schedule. In addition, some embodiments may be configured to adjust the temperature and/or humidity around the stack while the cement binder is curing. In embodiments where the curing process is exothermic, those skilled in the art will appreciate it may not be necessary to apply any external heat to the curing process.

After the cement binder has finished curing and hardened in the stack of trays and patterned plates, and the compressive forces have been removed, the trays (or plates) containing the cured cement binder may be individually removed from the stack. Each removed tray (or plate) contains a respective board of cured cement binder, which is now the material for the core layer, including a pattern of bevels for one or more flooring planks on its surface. In some embodiments, the cured boards of cement binder may be further processed, for example, by applying heat or otherwise desiccating the boards to remove moisture. The surface of the boards also may be sanded or otherwise smoothed or polished. In some embodiments, one or more additional layers, including but not limited to a décor layer, a protective layer, an acoustic layer, a balancing layer, and/or a cushioning layer, may be added above or below the cured cement binder to create a laminated structure for the one or more flooring planks. Finally, the one or more individual flooring planks may be cut from each board, or the laminated structure formed thereon, along the bevel pattern formed on the cement binder when it was cured.

Advantageously, the present disclosure provides a technique for forming bevels in flooring planks comprising MgO-based core layers where bevels previously could not be pressed or cut. For example, bevels having the appearance of conventional pressed bevels can be added to MgO flooring planks in the disclosed embodiments, even though mechanically pressing such bevels into the MgO planks would not be possible. The technique further provides precise control over the shapes and locations of the bevels that are formed using the patterned plates. Because the bevel patterns on the patterned plates can be changed for different implementations, the same technique can be used to create a desired embossing or texture on the surface of the flooring planks. More generally, the disclosed embodiments can be used to form bevels and/or other textures or embossing on a surface of a cement binder or other curable binder material used as the rigid core layer of flooring planks.

Another exemplary embodiment comprises a system for forming bevels in flooring planks, such as flooring planks comprising MgO. The system comprises a plurality of patterned plates having a flat surface on one side of the patterned plate and a pattern of bevels on the opposite side from the flat surface. The flat surface may be a top or a bottom surface of the pattern plate depending on how the pattern plate is oriented. The pattern of bevels may comprise a plurality of raised portions having a pattern, size, and shape corresponding to the desired geometric pattern of the bevels. For instance, in some embodiments, the depth, width, and/or length of the bevels can be adjusted based on a selection of the height, width, and/or length of the bevels on the pattern plate used to create a desired pattern of bevels in an uncured cement binder. Furthermore, in some embodiments, the shapes of the bevels on the patterned plate can be rectangular, V-shaped, rounded, or any other shape as desired.

The pattern of bevels may comprise a plurality of raised portions that are configured, when in contact with an uncured cement binder under pressure, to impart a corresponding bevel pattern to a surface of the cement binder. Each of the plurality of patterned plates can be stacked when filled with the uncured binder material. Additionally, the system may comprise a flat plate that can be positioned on the top of the stack or bottom of the stack depending on the orientation of the patterned plates in the stack.

These and other objects, features, and characteristics of the exemplary systems and/or methods disclosed herein, as well as the methods of operation and functions of the related elements of structure and the and the combination of parts and economies of manufacture, will become more apparent upon consideration of the following description and the appended claims with reference to the accompanying drawings, all of which form a part of this specification. It is to be understood the embodiments disclosed in the drawings and written description herein are for the purpose of illustration and description only and are not intended to limit the scope of the inventions defined in the claims.

BRIEF DESCRIPTION OF THE DRAWINGS

The drawings are provided for purposes of illustration only and merely depict typical or example implementations, wherein like reference numerals designate corresponding parts in the various figures. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE DISCLOSED EMBODIMENTS

Figure 1:
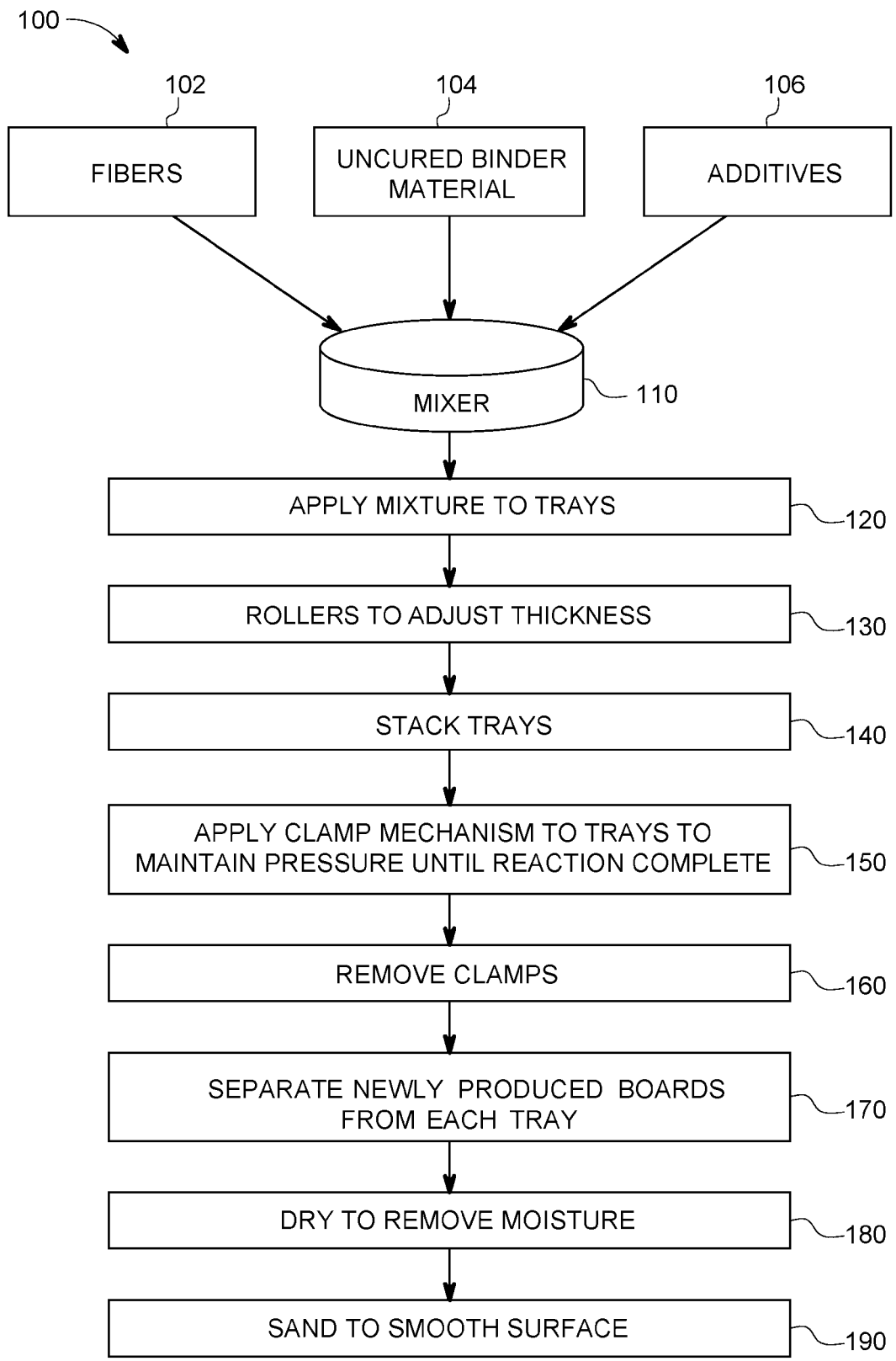
FIG. 1 is a flowchart showing an exemplary sequence of steps that may be performed to manufacture bevels in flooring planks in accordance with certain exemplary embodiments.

While the making and using of various embodiments of the invention are discussed in detail below, it should be appreciated that the present invention provides many applicable inventive concepts that are embodied in a wide variety of contexts. The specific embodiments discussed herein are merely illustrative of specific ways to make and use the present invention and should not limit the scope of the disclosure as defined by any appended claims. Those of ordinary skill in the art will recognize there are numerous equivalents, alternatives, and modifications that may be made to the exemplary disclosed systems and methods described herein and that are still within the scope of the invention and covered by the claims. It will be appreciated by those having skill in the art that the exemplary implementations described herein may be practiced without these specific details or with an equivalent arrangement. In various instances, well-known structures and devices are shown in block diagram form to avoid unnecessarily obscuring the implementations Referring now to the drawings, FIG. 1 is a flowchart showing an exemplary sequence of steps 100 that may be performed to manufacture bevels or other patterns, textures, or embossing on the surface of a rigid core layer for one or more flooring planks. The sequence 100 starts with a curable binder material 104 for forming a rigid core layer of a flooring plank, which in the exemplary embodiments is a cement binder material comprising MgO and one or more magnesium salts, such as magnesium chloride and/or magnesium sulfate. In some embodiments, one or more fibers 102 and/or additives 106 may be added to the curable binder material 104. For example, the fibers 102 may comprise any types of wood fibers, natural fibers (e.g., jute, coconut, cellulose, bamboo, straw, and other plants, among others), and/or synthetic fibers (e.g., polymers, glass, fiberglass, among others). The additives 106 may include, but are not limited to, foaming agents, heat stabilizers, wax, and/or impact modifiers to adjust other properties of the core layer.

In the disclosed embodiments, at step 110, the uncured cement binder material 104 together with any additional fibers 102 and/or additives 106 are combined together in a mixer, preferably as dry components that can be mixed without the further application of any water or other solvents. The resulting mixture at step 110 corresponds to a MgO-based cement binder that, when cured, may form a rigid core layer for one or more flooring planks.

At step 120, the MgO-based cement binder mixture is deposited onto one or more trays. For ease of explanation in FIG. 1, the terms "trays" in step 120 refers to either one or more flat trays or one or more patterned plates depending on the particular disclosed embodiment as described in more detail below. Further, those skilled in the art will appreciate that the trays may have various shapes and remain consistent with the disclosed embodiments. For example, any tray or plate that can store uncured binder material as described herein may be used as the trays in the disclosed embodiments. The trays may be formed of any materials, such as metals, ceramics, or plastics, or various composites thereof.

Next, at step 130, the trays containing the cement binder may be transported, such as on a conveyor belt, to a process that smooths and redistributes the cement binder to make its thickness more uniform in each tray, such as a calendaring process. For example, in step 130, at least one roller located at a predetermined height may be applied to the top surface of the cement binder mixture in each tray to smooth and adjust its thickness in the tray.

Figure 2:
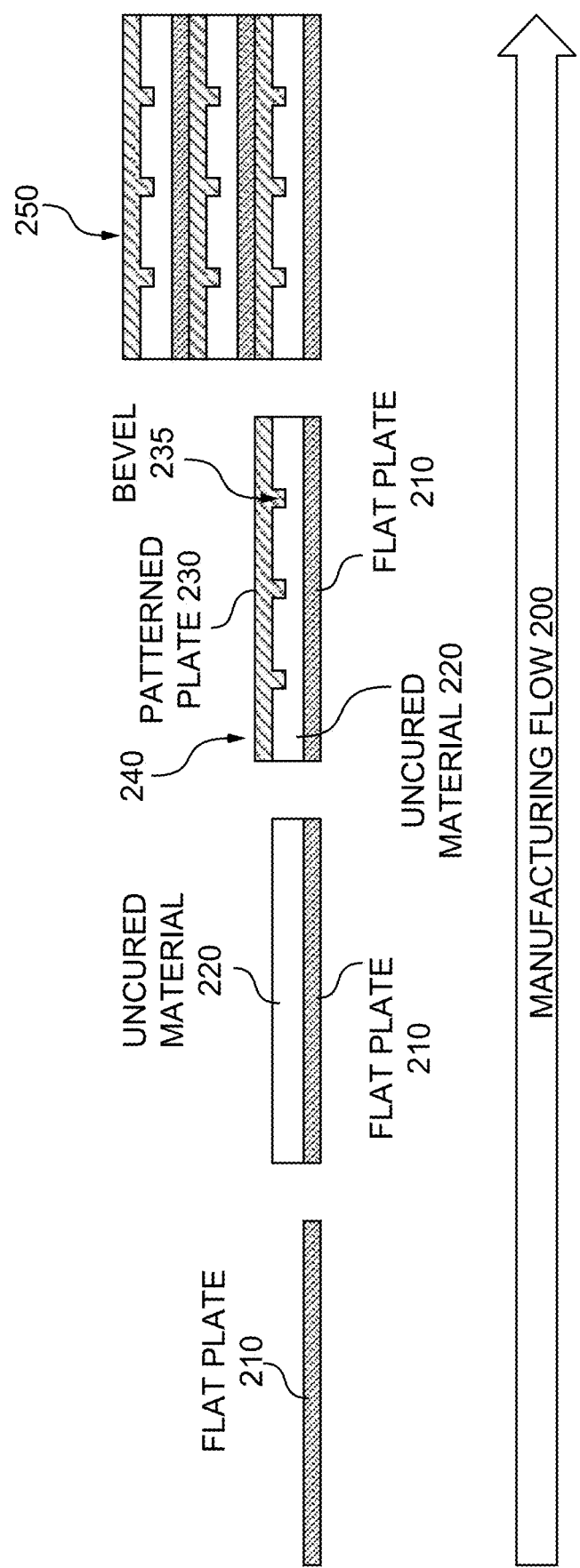
FIG. 2 is a schematic diagram illustrating exemplary manufacturing stages of a first manufacturing process that may be used to create bevels in flooring planks in accordance with certain exemplary embodiments.

At step 140, each tray containing the cement binder is stacked one on top of another. For example, FIG. 2 illustrates a schematic manufacturing flow 200 for a first exemplary embodiment that may be used to create a stack of trays at step 140. In FIG. 2, a flat plate 210 may contain the uncured cement binder 220 that was deposited into the tray at step 120. Although not shown in FIG. 2, the uncured cement binder 220 also may have been rolled or otherwise calendared to adjust its thickness. A patterned plate 230 may be stacked directly on top of the uncured cement binder 220 in the tray 210. The patterned plate 230 has a flat top surface and a bottom surface comprising a pattern of bevels 235 extending out from the bottom surface. Thus, when the patterned plate is placed directly on top of the uncured cement binder 220 in the first tray, the pattern of bevels 235 on the plate's bottom surface extends into the top surface of the uncured cement binder 220 to transfer the bevel pattern into the cement binder 220 as it cures. This configuration of a flat plate 210, uncured cement binder 220, and patterned plate 230 may form a stackable unit 240 that can be used to create a larger stack 250 of trays. That is, the stackable units 240 may be stacked one on top of the other, as FIG. 2 shows, to create the exemplary stack 250 of trays.

The pattern of bevels 235 preferably creates bevels that extend around one millimeter into the top surface of the uncured binder material 220. In some embodiments, the pattern of bevels 235 may extend to a depth of greater than one millimeter (mm) in the uncured binder material. It is understood that the depth of the bevels can be adjusted as desired, and for instance can have a depth of about 0.5 mm to about 2 mm, about 0.5 mm to about 1 mm, about 1 mm to about 1.5 mm, or about 1.5 mm to about 2 mm. In some embodiments the depth may be greater than 2 mm or less than 0.5 mm.

Although the exemplary bevels 235 would create rectangular grooves defining the outlines of one or more flooring planks, other shapes of the bevels 235 are also possible. For example, the bevels 235 can be shaped to create, for example, V-shaped bevels between adjacent flooring planks, rounded edges to simulate pressed or pillowed bevels between the adjacent flooring planks, or any other desired bevel shapes.

Figure 3:
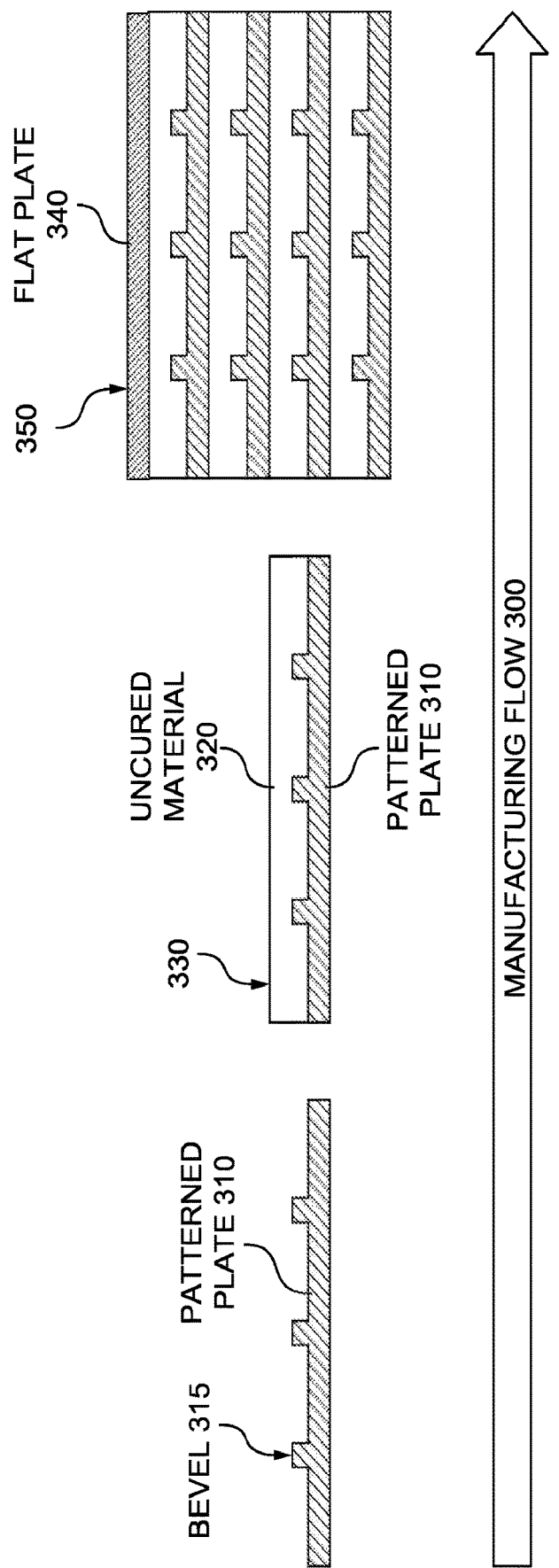
FIG. 3 is a schematic diagram illustrating exemplary manufacturing stages of a second manufacturing process that may be used to create bevels in flooring planks in accordance with certain alternative exemplary embodiments.

FIG. 3 illustrates a schematic manufacturing flow 300 for a second exemplary embodiment that may be used to create a stack of trays at step 140. In FIG. 3, each tray is implemented as a patterned plate 310 having a flat bottom surface and a top surface comprising a raised pattern of bevels 315. Uncured cement binder 320 is deposited into each such patterned plate 310, thus covering its raised bevel pattern. Thus, as the cement binder cures, the pattern of bevels will define the shape and location of one or more bevels 315 in a bottom surface of the cement binder after it has cured. This configuration of a patterned plate 310 and uncured cement binder 320 may form a stackable unit 330 that can be used to create a larger stack 350 of trays as shown in the exemplary embodiment of FIG. 3.

In the exemplary embodiment of FIG. 3, the pattern of bevels 315 preferably creates bevels having a depth of around one millimeter in a bottom surface of the uncured binder material 320. In some embodiments, the bevels 315 may extend to a depth of greater than one millimeter. Although the exemplary bevels 315 would create rectangular grooves defining the outlines of one or more flooring planks, other shapes of the bevels are also possible. For example, the bevels 315 can be shaped to create, for example, V-shaped bevels between adjacent flooring planks, rounded edges to simulate pressed or pillowed bevels between the adjacent flooring planks, or any other desired bevel shapes.

After one or more stackable units 330 have been added to the stack 350, a flat tray 340 may be placed at the top of the stack 350 as a capping layer to cover the exposed cement binder 320 in the topmost stackable unit 330 in the stack 350. This flat tray 340 also provides a flat surface at the top of the stack to facilitate the application of a compressive pressure to the stack 350 at step 150. The flat tray 340 may be a flat tray 210 as shown in the exemplary embodiment of FIG. 2 or any other flat plate that can serve as a flat capping layer for the stack 350 in FIG. 3.

Figure 4B:
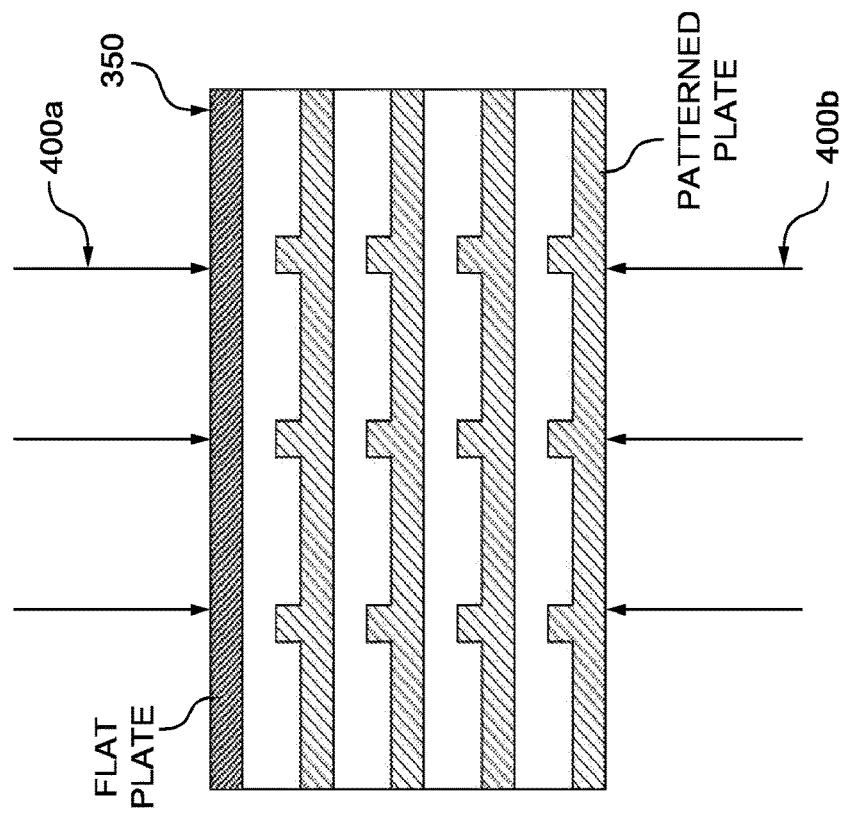
FIG. 4B is a schematic diagram illustrating additional exemplary steps that may be performed in connection with the exemplary second manufacturing process of FIG. 3.
Figure 4A:
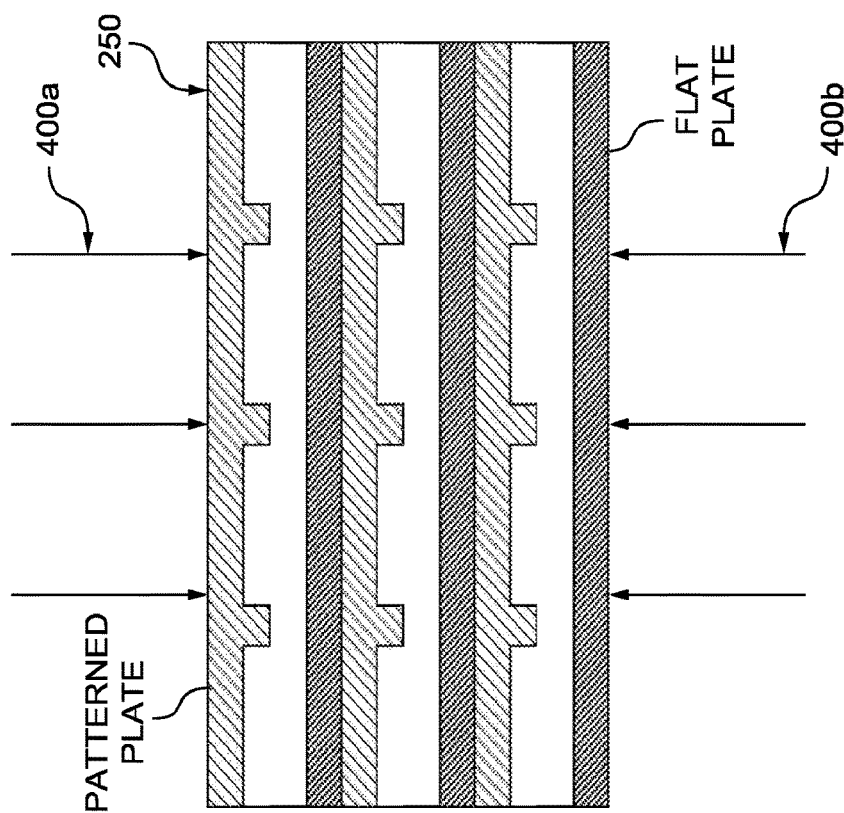
FIG. 4A is a schematic diagram illustrating additional exemplary steps that may be performed in connection with the exemplary first manufacturing process of FIG. 2.

Returning again to FIG. 1, at step 150 a pressure may be applied to one or both of the top and bottom of the stack during the curing process to help form the bevels in the MgO cement binder as it cures and hardens. In some embodiments, a compression force may be applied to only one of the top or bottom surfaces of the stack, for example, if the other surface is positioned on a stationary surface (such as a floor). In step 150, a clamping mechanism or other vice-type of apparatus may be used to apply the compressive force to one or more outer surfaces of the stack of trays. FIG. 4A, for example, shows a first compression force 400a applied to the top-most patterned plate 230 of exemplary stack 250 and a second compression force 400b applied to the flat plate 210 located at the bottom of the exemplary stack 250 of trays in the exemplary embodiment of FIG. 2. Similarly, FIG. 4B shows a first compression force 400a applied to the flat plate 340 and a second compression force 400b applied to the bottom-most patterned plate 310 of an exemplary stack 350 of trays in the exemplary embodiment of FIG. 3.

Preferably, at step 150, a pressure is constantly applied to the stack of trays for a sufficient amount of time to allow the cement binder to cure in the trays. For example, a constant pressure of around 10 megapascals (MPa) to around 16 MPa may be applied to the stack 250 or 350 while the cement binder is being cured in the stacked trays. Alternatively, it is also contemplated that the compression force may be applied and removed or modified according to any desired schedule. In some disclosed embodiments, the depth of the pattern of bevels 235 or 315 may depend on the amount of pressure applied to the stack of trays. For example, relatively larger bevels 235 or 315, e.g., at or around one millimeter in depth, may be employed when larger applied pressures are used at step 150. Conversely, relatively shallower bevels 235 or 315, e.g., less than one millimeter in depth, may be used for lower applied pressures at step 150.

In some embodiments, the ambient temperature and/or humidity may be controlled around the stack 250 or 350 while the cement binder is curing. For example, in some embodiments an external heat source may be applied to raise the temperature of the stack 250 or 350 to facilitate or expedite the curing process. In embodiments where the curing process is exothermic, however, those skilled in the art will appreciate it may not be necessary to apply any external heat to the curing process. Similarly, some embodiments may dehumidify an area around the stack 250 or 350. Further, in some embodiments the temperature and/or humidity controls may be applied while a pressure is being applied to the stack of trays 250 or 350 at step 150.

After a sufficient amount of time has passed to allow the cement binder to cure at step 150, then at step 160 the applied pressure may be removed, such as by removing the stack 250 or 350 from a clamping mechanism or other vice-type of apparatus. Next, the newly-produced boards of cured cement binder, which may be the material for a rigid core layer of one or more flooring planks, are separated from their respective trays at step 170. At step 180, the cured boards of cement binder may be further processed, for example, by applying heat or otherwise desiccating the boards to remove moisture. At step 190, the surface of the boards also may be sanded or otherwise smoothed or polished to improve its surface smoothness.

In some embodiments, one or more additional layers, including but not limited to a décor layer, a protective layer, an acoustic layer, a balancing layer, and/or a cushioning layer, may be added above or below the core layer to create a laminated structure for one or more flooring planks. For instance, a décor layer may be formed over the core layer, such as by applying a layer comprising a decorative paper impregnated with melamine or another resin, or by digitally printing a decorative pattern over the surface of the cured cement binder layer. In some embodiments, a protective wear layer comprising a resin or lacquer may be deposited over the décor layer, and in some embodiments, a balancing layer may be deposited between the core layer and the décor layer for added stability. In some embodiments, an acoustic layer, such as a cork, polyvinyl chloride, or rubber layer, also may be added between the core layer and the décor layer to reduce the transmission and/or reflection of sounds or generation of noise due to foot traffic. In some embodiments, a cushioning layer, such as a rubber or cork layer, may be added below the core layer to provide added comfort for people walking on the floor planks. Any one or more of the above-identified layers may be added above or below (as appropriate) each board of cured cement binder corresponding to a core layer for one or more flooring planks after performing the exemplary sequence of steps 100 in FIG. 1.

Figure 5:
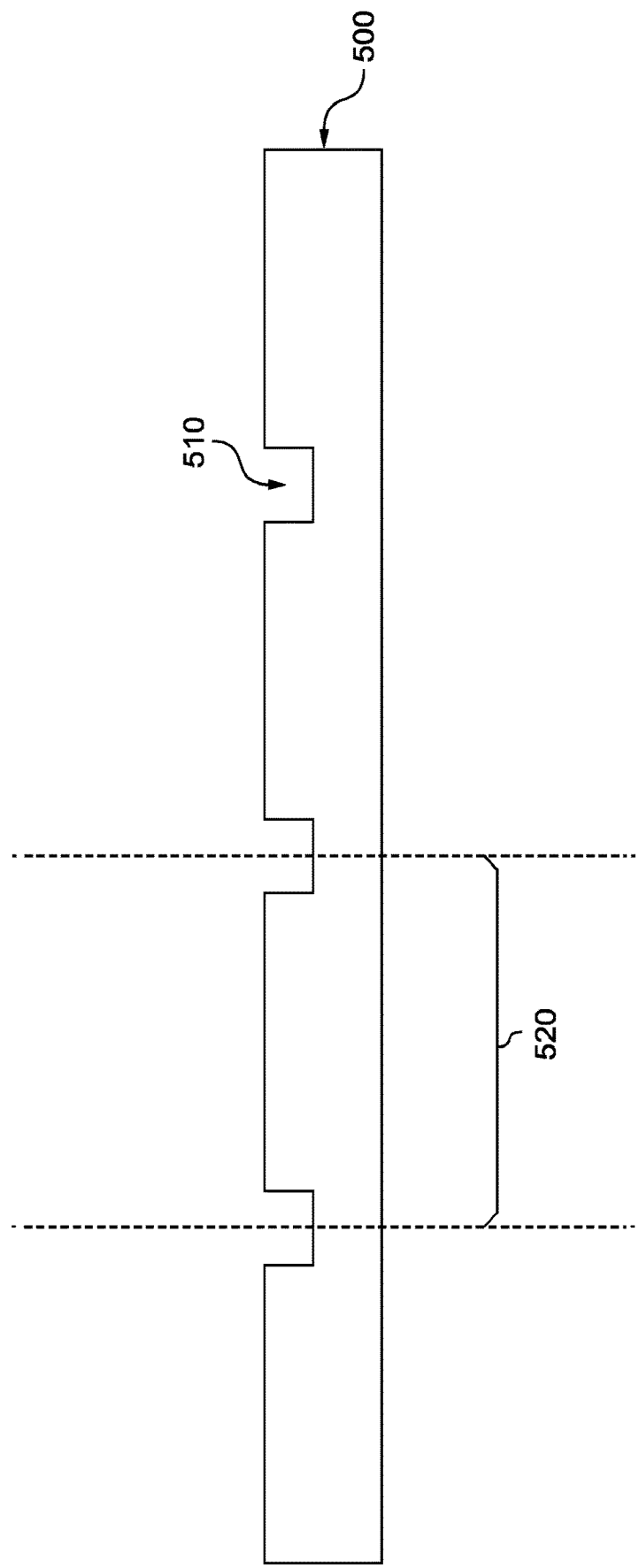
FIG. 5 is a schematic cross-sectional diagram of a rigid core layer containing bevels that may be manufactured for one or more flooring planks in accordance with certain exemplary embodiments.

FIG. 5 illustrates an example of a separated board 500 of the core layer material after it has been cured and removed in accordance with the exemplary embodiments described herein. As explained above, in the disclosed embodiments the shapes and locations of beveled edges 510 for one or more flooring planks are formed directly in the board of core layer material 500. For example, in some embodiments, a length or width dimension of an individual flooring plank 520 may be defined as the distance between the midpoints (shown as dotted lines) of adjacent bevels 510 on the board 500. Therefore, the board of core layer material 500 may be cut along the bevels 510 formed on its surface to create core layers for different flooring planks. The one or more individual flooring planks may be cut from each board 500, or the laminated structure formed thereon, along the bevel pattern formed on the cement binder when it was cured.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. For example, while the exemplary disclosed embodiments have been described in connection with a cement binder to form a core layer for one or more flooring planks, those skilled in the art will appreciate that the exemplary embodiments may be used to create core layers using any binder material that undergoes a curing process to harden and become rigid. For example, the exemplary embodiments may use be used to create core layers comprising MDF, cement, concrete, plasterboard, PU, and/or other types of materials. In some alternative embodiments, the core layers formed according to the exemplary embodiments may be used in ceiling boards or wall boards. And while the exemplary embodiments describe techniques for creating a pattern of bevels directly in a surface of a core layer material, those skilled in the art will understand that the disclosed embodiments alternatively may be used to create any desired texture, embossing, and/or bevels in the surface of the core layer as it cures. The disclosed technique herein advantageously may be incorporated into existing flooring-plank manufacturing processes. Accordingly, this disclosure should be considered exemplary only, and the scope of the invention is accordingly intended to be limited only by the following claims.

We claim:

1. A method for forming a core layer for a flooring plank having one or more beveled edges, the method comprising:
    (a) depositing an uncured binder material into a tray;
    (b) placing a patterned plate over the uncured binder material in the tray, the patterned plate having a pattern of bevels that extend into a surface of the uncured binder material when the patterned plate is placed over the tray;
    (c) adding the tray and patterned plate onto a stack of one or more trays, wherein each tray in the stack comprises uncured binder material and has a corresponding patterned plate;
    (d) applying a pressure to the stack of trays as the uncured binder material is in the process of curing in each of the trays in the stack;
    (e) removing the applied pressure from the stack of trays;
    (f) separating a board of cured binder material from each tray in the stack, wherein each board has the pattern of bevels formed on a surface of the board, and wherein the pattern of bevels corresponds to one or more flooring planks; and
    (g) cutting each board of cured binder material along the pattern of bevels to create a core layer for one or more flooring planks.

2. The method of claim 1, wherein the uncured binder material comprises magnesium oxide and at least one magnesium salt.

3. The method of claim 2, wherein the at least one magnesium salt comprises magnesium chloride or magnesium sulfate.

4. The method of claim 2, wherein the uncured binder material further comprises at least one of fibers or additives.

5. The method of claim 1, further comprising:
    adjusting a thickness of the uncured binder material in each tray after depositing the uncured binder material into the tray.

6. The method of claim 1, wherein step (d) further comprises applying a clamp mechanism to the stack of trays to apply the pressure to the stack, and wherein step (e) further comprises removing the clamp mechanism from the stack of trays to remove the applied pressure.

7. The method of claim 1, wherein the applied pressure is in the range of 10 to 16 megapascals.

8. The method of claim 1, further comprising:
    drying each separated board of cured binder material to remove moisture; and
    sanding each separated board to improve its surface smoothness.

9. The method of claim 1, further comprising:
    adding one or more additional layers to each separated board of cured binder material before cutting each board along the pattern of bevels.

10. The method of claim 9, wherein the one or more additional layers comprises at least one of a décor layer, a protective layer, an acoustic layer, a balancing layer, or a cushioning layer to create a laminated structure for the one or more flooring planks.

11. A core layer for a flooring plank formed according to the method of claim 1.

12. A method for forming a core layer for a flooring plank having one or more beveled edges, the method comprising:
    (a) depositing an uncured binder material into a patterned plate, wherein the patterned plate has a pattern of bevels that are covered by the uncured binder material when the uncured binder material is deposited into the patterned plate;
    (b) adding the patterned plate onto a stack of patterned plates,
    wherein the stack contains one or more patterned plates each containing uncured binder material;
    (c) adding a flat plate over the topmost patterned plate in the stack;
    (d) applying a pressure to the stack of patterned plates as the uncured binder material is in the process of curing in each of the patterned plates in the stack;
    (e) removing the applied pressure from the stack of patterned plates;
    (f) separating a board of cured binder material from each patterned plate in the stack, wherein each board has the pattern of bevels formed on a surface of the board, and wherein the pattern of bevels corresponds to one or more flooring planks; and
    (g) cutting each board of cured binder material along the pattern of bevels to create a core layer for one or more flooring planks.

13. The method of claim 12, wherein the uncured binder material comprises magnesium oxide and at least one magnesium salt.

14. The method of claim 13, wherein the at least one magnesium salt comprises magnesium chloride or magnesium sulfate.

15. The method of claim 13, wherein the uncured binder material further comprises at least one of fibers or additives.

16. The method of claim 12, further comprising:
adjusting a thickness of the uncured binder material in each patterned plate after depositing the uncured binder material into the patterned plate.

17. The method of claim 12, wherein step (d) further comprises applying a clamp mechanism to the stack of patterned plates to apply the pressure to the stack, and wherein step (e) further comprises removing the clamp mechanism from the stack of trays to remove the applied pressure.

18. The method of claim 12, wherein the applied pressure is in the range of 10 to 16 megapascals.

19. The method of claim 12, further comprising:
drying each separated board of cured binder material to remove moisture; and
sanding each separated board to improve its surface smoothness.

20. The method of claim 12, further comprising:
adding one or more additional layers to each separated board of cured binder material before cutting each board along the pattern of bevels.

21. The method of claim 20, wherein the one or more additional layers comprises at least one of a décor layer, a protective layer, an acoustic layer, a balancing layer, or a cushioning layer to create a laminated structure for the one or more flooring planks.

22. A core layer for a flooring plank formed according to the method of claim 12.

\* \* \* \* \*